(12) United States Patent
Obusek

(10) Patent No.: US 9,286,162 B2
(45) Date of Patent: Mar. 15, 2016

(54) SYSTEM AND METHOD FOR GUARANTEEING CONSISTENT DATA SYNCHRONIZATION FROM A VOLATILE DATA SOURCE

(75) Inventor: Ernest Obusek, Monroeville, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/364,977

(22) Filed: Feb. 2, 2012

(65) Prior Publication Data

US 2013/0204841 A1 Aug. 8, 2013

(51) Int. Cl.
*G06F 17/30* (2006.01)
*G06F 11/14* (2006.01)
*G06F 11/20* (2006.01)

(52) U.S. Cl.
CPC ............ *G06F 11/14* (2013.01); *G06F 11/2097* (2013.01); *G06F 17/30578* (2013.01); *G06F 11/2094* (2013.01); *G06F 2201/82* (2013.01)

(58) Field of Classification Search
USPC ........................................................ 707/624
See application file for complete search history.

(56) References Cited

U.S. PATENT DOCUMENTS

| | | | |
|---|---|---|---|
| 5,933,837 A | 8/1999 | Kung | |
| 7,483,923 B2 | 1/2009 | Novik | |
| 7,577,691 B2 | 8/2009 | Novik et al. | |
| 7,657,548 B2 * | 2/2010 | Seiler et al. | 707/999.1 |
| 7,769,727 B2 | 8/2010 | Sivapragasam et al. | |
| 7,788,225 B2 * | 8/2010 | Fish et al. | 707/624 |
| 8,255,360 B1 * | 8/2012 | Wallace et al. | 707/620 |
| 8,260,742 B2 * | 9/2012 | Cognigni et al. | 707/620 |
| 2004/0068523 A1 * | 4/2004 | Keith et al. | 707/200 |
| 2008/0104277 A1 * | 5/2008 | Tian | 709/248 |
| 2009/0006489 A1 | 1/2009 | Ramasubramanian et al. | |
| 2010/0257149 A1 | 10/2010 | Cognigni et al. | |
| 2011/0078110 A1 * | 3/2011 | Joseph | 707/610 |
| 2011/0246420 A1 * | 10/2011 | Wang et al. | 707/624 |
| 2012/0265562 A1 * | 10/2012 | Daouk et al. | 705/5 |

* cited by examiner

*Primary Examiner* — Hung Q Pham

(74) *Attorney, Agent, or Firm* — Kilpatrick Townsend & Stockton LLP

(57) ABSTRACT

Systems and methods for, among other things, updating a destination data set of hierarchical data in relation to a source set of hierarchical data. The method, in certain embodiments, includes receiving an indication that the source data set has one or more changes, initiating a comparison between the source data set and the destination data set, identifying differences and related hierarchical relationships, and altering the destination data set by performing changes in an order that preserves the hierarchical relationships. The method may use the change notifications as an indicator to start the comparison and restart the comparison upon the receipt of a new notification. By using this method, the two data sets can be kept synchronized while preserving hierarchical relationships between the data elements in an environment where the source data set experiences unpredictable changes and cannot be locked.

21 Claims, 9 Drawing Sheets

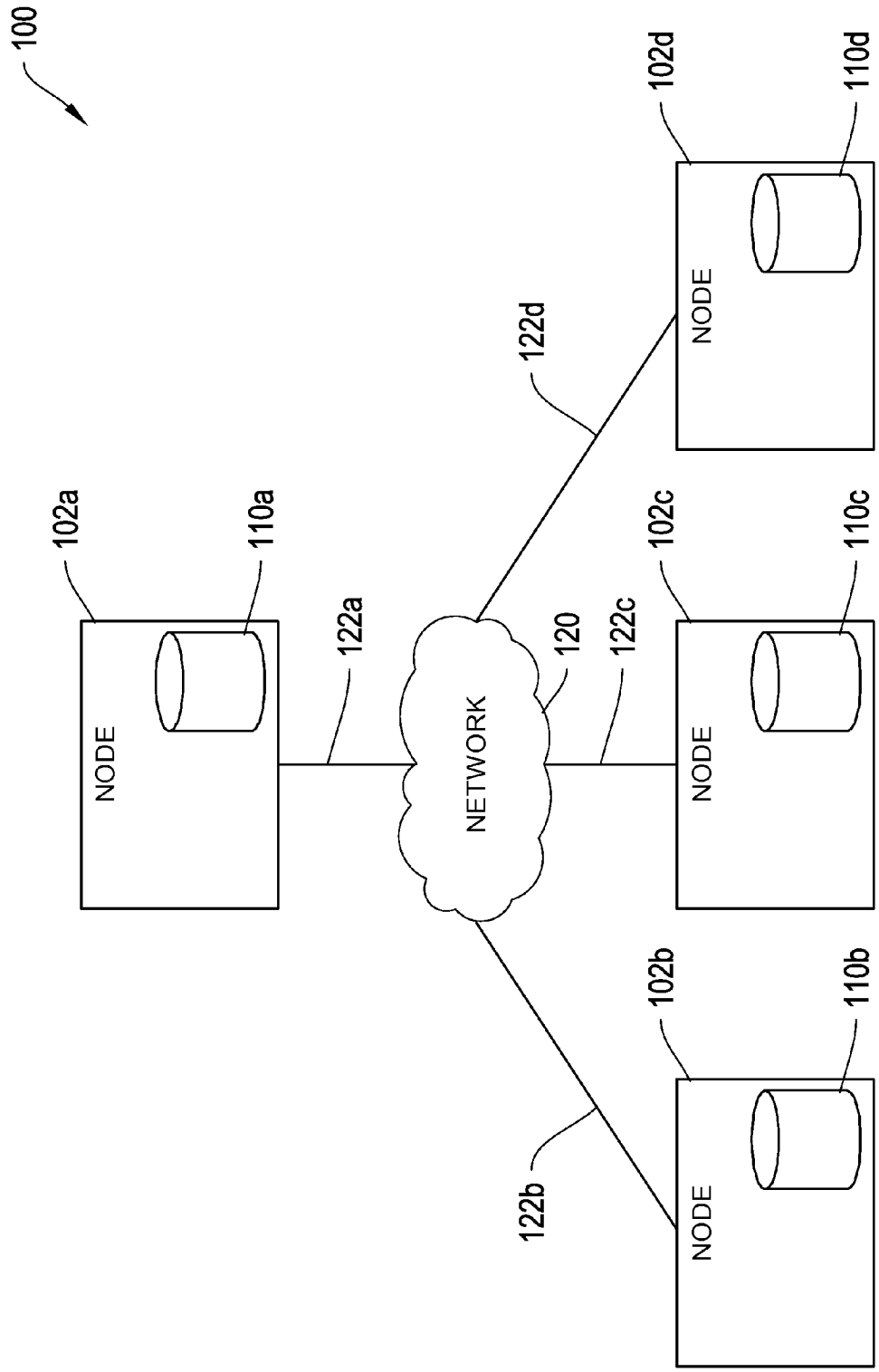

SYSTEM AND METHOD FOR GUARANTEEING CONSISTENT DATA SYNCHRONIZATION FROM A VOLATILE DATA SOURCE

FIELD OF THE INVENTION

The systems and methods described herein relate to storage systems, and in particular, to systems and methods for synchronizing a data set and its copies in an environment that does not support file locking.

BACKGROUND

Today, software systems are used to manage large collections of data to make that data more easily and quickly available. To this end, software systems may replicate some or all of the data set being managed. Replication of the stored data set can improve availability of the data set, as well as fault tolerance. For example, a database management system may replicate a large data set across multiple locations, where each location provides storage for the local copy of the data set and support for processes that access and use the local data set copy. A user at such a location, typically referred to as a node, accesses its local copy of the data set to avoid the bottlenecks that appear when all users are accessing a single master copy, and thereby achieve high availability. Thus, reading data from the database can be done much more quickly when each node has a local copy. Moreover, in the event of a node failure, the data set of the failed node can be replaced or repaired by accessing a data set stored on another node.

The advantages of using replicated data sets come at the expense of increased system complexity. Although read operations make no changes to the data set, edits and deletions will change the stored data. Replication of a data set requires the system to synchronize duplicated copies of the data set so data integrity is maintained. Maintaining data integrity typically means that each user perceives a single logical data set instead of perceiving a system of multiple independent copies that contain different data.

To maintain data integrity across multiple nodes, the software system typically designates one data set to be the master copy, and designates the other nodes as copies of the master. As the distributed nodes operate on the different data sets, the operations are monitored by the node storing the master copy. In one system, the master node monitors the other nodes to log the changes the nodes propose to make to their respective local data sets. In this system, a mechanism synchronizes the data sets by coordinating the actions of the separate nodes. As the different nodes are independently making changes to their local data set, some mechanism is to be employed to synchronize the local data sets with the master data set. This synchronization mechanism may, for example, log the proposed changes, make the changes first to the master copy, then publish all the changes made to the master copy to the other nodes. The published updates are made by the other nodes to their local copies, and the nodes then confirm the updates by sending an acknowledgement to the master node. Typically, the master data set publishes the updates as the updates are made. The copies then make the changes as updates are published.

Although these systems can work well, relying on a master copy to control updates can create a bottleneck that slows overall system performance. To address this, some software systems allow multiple nodes to publish the changes made to their respective local data set. Each node responds to these published changes and coordinates the changes in a way that seeks to maintain the integrity of each local data set relative to the other data sets in the system.

Although such systems can provide improved performance, the asynchronous character of the data set updates published by multiple nodes can cause data integrity to suffer between data set copies. To address this, some systems employ a file locking process that locks local data set copies during update processes. This ensures that updates are consistent across copies. Although this lock process can work well, it can reduce data set availability.

As such, there is a need for systems that allow multiple data sets to maintain synchronization through processes that provide data integrity and high availability.

SUMMARY

In certain embodiments, the system and methods described herein relate to synchronizing data sets, including systems that maintain a consistent view of plural data set copies, as the source data set, which may be a physical master data copy, a logical master data copy or a system abstraction of a master copy, is changing. In one embodiment, the systems and methods described herein identify the hierarchical relationships of a data element being changed within the data set and use the identified hierarchical relationships to control the order of changes to a data set. Hierarchically dependent data elements refer to data elements which are ranked, ordered, or graded into successive levels such that the elements are represented as being above, such as a parent element, below, such as a child element, or at the same level as other data elements.

It is one realization of the systems and methods described herein, that synchronization algorithms that update data sets as, at least in part, a function of the hierarchical characteristics of the data elements in the data set can improve the internal consistency of the hierarchical relationships, including within environments where changes to the data set are being issued in unpredictable ways. These systems and processes, among other things, reduce transient inconsistencies between copies of a data set. For example, the systems and methods described herein may be employed for use with a distributed data set, where a data set may be distributed amongst one or more nodes, and changes to the data set may come from any node in the network. In such cases, changes to the data set may issue in an order which contradicts the hierarchical relationships between the elements of the data set. For example, child data elements may be added to data copies before the parent data elements. The systems and methods described herein employ the identified hierarchical relationships of the data being changed to avoid creating inconsistencies in local data set copies.

The systems and methods described herein include, in certain embodiments and practices, methods for receiving an indication that the source data set has one or more changes, initiating a comparison between the source data set and the destination data set, identifying differences and related hierarchical relationships, and altering the destination data set by performing changes in an order that preserve the hierarchical relationships. The method may use the change notifications as an indicator to start the comparison and restart the comparison upon the receipt of a new notification. By using this method, the two data sets can be kept synchronized while preserving hierarchical relationships between the data elements in an environment where the source data set experiences unpredictable changes and cannot be locked.

In some embodiments, a single node may keep a master copy of the data set, i.e., the source data set, with every other node maintaining a copy of the master data set, i.e., the destination data sets. In alternate embodiments, the data set may be distributed among several nodes, with a respective node storing a subset of the data set. In yet other embodiments, the source data set may be a logical data set that represents a master state for the data set, being the state that the data set copies in the system should synchronize against to achieve coherency. This logical data set may be maintained by a state process that monitors or tracks changes being made to the data set copies and provides a reference state representative of the state that the data set copies will synchronize against. In either case, the source data set could be distributed amongst several nodes, with changes to a destination data set being issued from multiple nodes. In such embodiments, it may not be possible to pause, interrupt, or lock the changes coming in from the source data set. Furthermore, changes from the source data set may be issued out of order, for example due to network latency, or issued in ways which violate the hierarchical relationships between the data elements of the destination data set. For example, changes can issue from the source data set which cause a child element to be left without a corresponding parent element. In such a dynamic environment, the destination data set is to be updated in an order related to the hierarchical relationships of the data elements.

In some embodiments, a destination node employs a received change notification as an indication to start a comparison between the source and destination data set. Although the change notification may contain information regarding the location and nature of the change, the destination node may initiate the comparison at the beginning of the data set and compares the data elements in sequential order. In some embodiments, the data elements may be grouped into tables with version numbers. In this case, the method may first compare table version numbers to identify a modified table, and compare data elements within the modified table in sequential order, and typically comparing respective data elements within corresponding tables.

A difference may be identified between the source and destination data set which indicates a change to be made to the destination data set. Optionally, identifying differences may include identifying hierarchical characteristics associated with the differences and may comprise identifying meta-data associated with a data source and representative of hierarchical relationships between data elements in the data source. Further optionally, the method may generate a list of the identified differences and the hierarchical relationship of data elements associated with the identified differences. In one practice, changes are made to synchronize the destination data set to the source data set by processing a list of identified differences and related hierarchical relationships to direct a sequence of changes to the destination data set by the related hierarchical relationships. For example, in the case of an addition of a data element, a parent element is added before its corresponding children elements. In the case of a modification of a data element, the modification may change the maximum number of children that can be assigned to a parent element, which may result in children elements being removed prior to modification of the parent element.

The deletion of a data element may include steps to provide hierarchical consistency of the destination data set. In particular, the deletion of a parent element may be implemented subsequent to the deletion of its corresponding children elements. To achieve this, the comparison process in one process identifies the corresponding children elements that are hierarchically dependent on the parent element to be deleted. Of the identified data elements, the elements that are themselves parent elements, i.e., elements that have hierarchically dependent children elements, are added to a list of parent elements to be processed, optionally at a later time. The elements that lack hierarchically dependent children elements may be deleted from the destination data set. The elements on the list of parent elements may be deleted in an order that avoids leaving a child element without a corresponding parent element.

At unscheduled times during the data synchronization process, an additional change notification may be received indicating that the source data set has been modified. Upon receipt of the change notification, the comparison may restart from the beginning of the data set. Although not all changes may have been implemented to the destination data set when the additional change notification is received, the destination data set has been modified in an order that avoids the production of a child element lacking a parent element, preserving hierarchical consistency. In some embodiments and practices, the method is restarted after a delay sufficient to allow more change notifications to be issued before another comparison is initiated.

The systems and methods described herein allow data synchronization of two data sets to be performed while preserving hierarchical relationships between data elements in an environment that does not support file locking. Other objects, features, and advantages of the present invention will become apparent upon examining the following detailed description of an embodiment thereof, taken in conjunction with the attached drawings.

BRIEF DESCRIPTION OF THE FIGURES

The systems and methods described herein are set forth in the appended claims. However, for purpose of explanation, several illustrative embodiments are set forth in the following figures.

FIGS. 1A and 1B are schematic block diagrams of exemplary storage environments in which some embodiments may operate.

DETAILED DESCRIPTION OF CERTAIN ILLUSTRATED EMBODIMENTS

To provide an overall understanding of the system and methods described herein, certain illustrative embodiments will now be described, including systems and methods for synchronizing data sets with hierarchical data elements. However, it will be understood by one of ordinary skill in the art that the methods and systems described herein may be adapted and modified as is appropriate for other applications and uses and that the system and methods described herein may be modified as suited to address such other uses, and that such additions and modifications will not depart from the scope hereof.

In one embodiment, systems and methods described herein update a destination data set, which typically is a copy of a larger data set, of hierarchical data in relation to a source set of hierarchical data, where the source data set is typically the data set to which other data sets will be synchronized. The method, in certain embodiments, includes receiving an indication that the source data set has one or more changes, initiating a comparison between the source data set and the destination data set, identifying differences between the source data set and the destination data set and identifying related hierarchical characteristics of the identified differences. The process alters the destination data set by performing changes in an order that is set, at least in part, by the hierarchical relationships of the data set that is being updated. For example, a change to the source data set, which may be in certain embodiments the master data set, may involve the addition of data into the data set. The added data may be hierarchical data with one datum characterized as parent data and a related datum characterized as child data. The systems and methods described herein may alter the source data set and the destination data set, which in certain embodiments may be the local data set copy, through a sequence of operations that add the parent datum and, in a subsequent operation add the child datum.

This order of operations that is determined, at least in part, by the hierarchical relationship of the data, reduces the likelihood that an intervening read operation of the destination data set will result in the production of child data lacking parent data, where the parent data exists in the source data set. Thus, by using these methods, the two data sets may be synchronized through a process that provides increased data integrity by reducing logical inconsistencies, and preserves hierarchical relationships between the data elements in environments where the source data set experiences unpredictable changes and, typically, cannot or will not be locked.

Figure 1B:
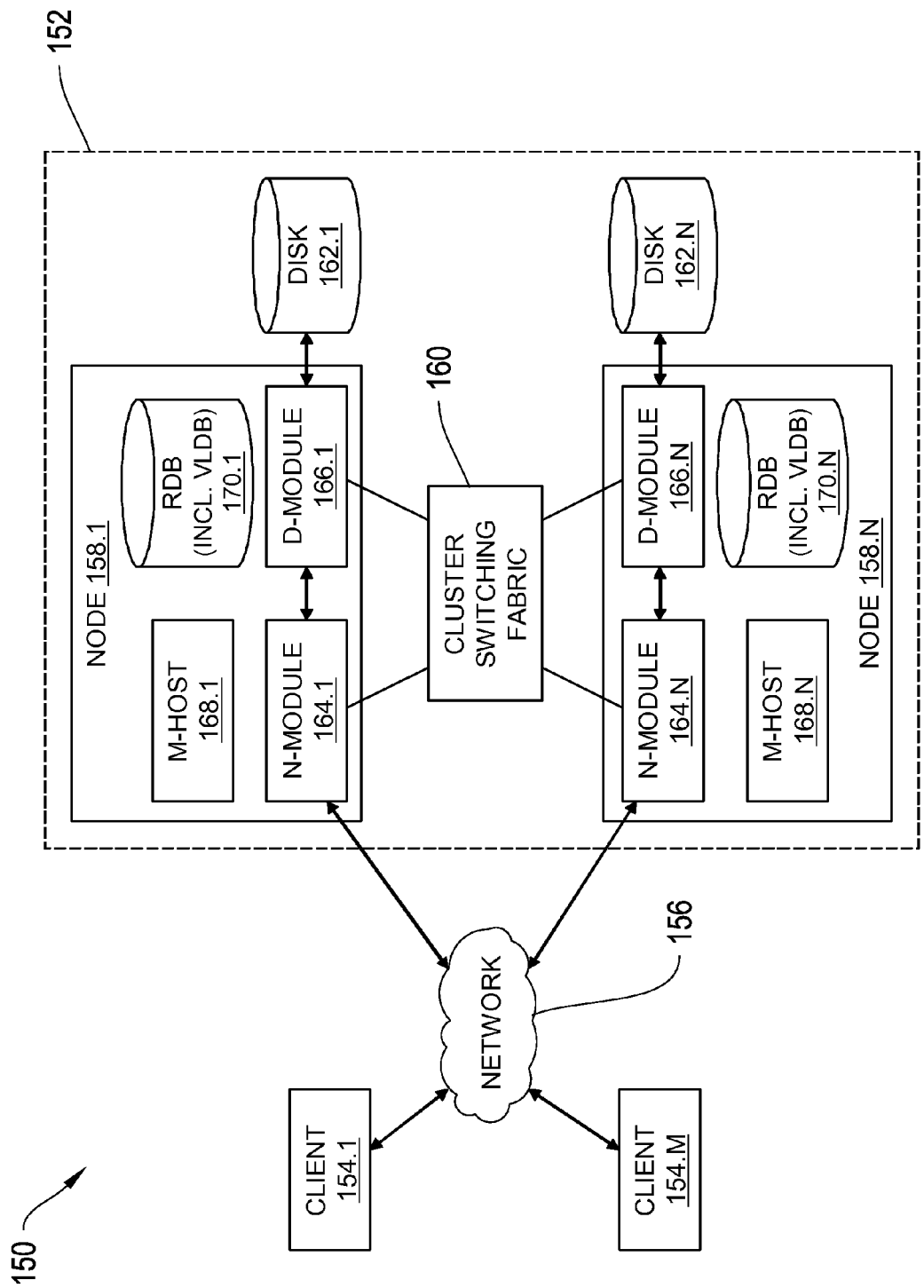

FIGS. 1A and 1B are schematic block diagrams of an exemplary data storage environment in which some embodiments may operate. In FIG. 1A, the depicted data storage system 100 includes nodes 102a-d having respective memories 110a-d, network 120, and network links 122a-d. The storage system 100 could be any suitable system for distributing information amongst the depicted plurality of nodes. Typically, the storage system 100 is a computer application that manages a corpus of data and system storage operations, including storing data, retrieving data and organizing the data corpus according to some logical structure, which may for example include files, tables or some other organizational framework. Further, the storage system 100 is only an example of the type of data storage application that can be supported by the systems and methods described herein. The storage system 100 alternatively may be any suitable data storage application, including a file storage system, such as the commercially available Data ONTAP data management environment developed by NetApp, Inc., the assignee hereof, a database application, or any other storage application. As such, those of skill in the art will recognize that the systems and methods described herein can work with any storage system that stores replicated data sets or portions of replicated data sets, such as database systems, storage operating systems, cloud storage systems, data filers with replicated data storage, RAID storage systems, or any other storage system or application having replicated data.

The nodes 102a-d may be computer systems that implement services of the storage system 100 to store and manage data. To that end, the nodes 102a-d may have and execute one or more applications that submit access and modify requests to the storage system 100, or an application executing on the storage system 100 such as a database application, to access and/or modify the data set maintained by the storage system 100. The nodes 102a-102d may consist of a hardware platform that may be any suitable computing system that can support storing and processing data sets. For example, the nodes 102a-d can be a commercially available network appliance, such as a file server appliance, or maybe a conventional data processing platform such as an IBM® PC-compatible computer running the Windows® operating system, or a SUN® workstation running a UNIX operating system. Alternatively, the nodes 102a-d can comprise a dedicated processing system that includes an embedded programmable data processing system such as a single board computer. The nodes 102a-d also include a memory 110a-d which can be any suitable data memory, including a hard disk drive, RAID system, tape drive system, flash memory, magnetic disk, or any other suitable memory. Additionally, the memory may be real, virtual or a combination of real and virtual. The depicted memories 110a-d store a local data set, which may be a full copy or a partial copy of a master data set.

The nodes 102a-d in the storage system 100 are connected to the network 120 through a plurality of network links 122a-d. The network 120 can be any suitable connection system for connecting the nodes 102a-d and exchanging data and/or commands. Typically, the network 120 is a computer network such as a Local Area Network (LAN), a Wide Area Network (WAN), a Metropolitan Area Network (MAN), the Internet or any other type of network or communication system and may comprise wired links, wireless links, or a combination of wired and wireless links.

FIG. 1B depicts a network data storage environment, which can represent a more detailed view of the environment in FIG. 1A. The environment 150 includes a plurality of client systems 154 (154.1-154.M), a clustered storage server system 152, and a computer network 156 connecting the client systems 154 and the clustered storage server system 152. As shown in FIG. 1B, the clustered storage server system 152 includes a plurality of server nodes 158 (158.1-158.N), a cluster switching fabric 160, and a plurality of mass storage devices 162 (162.1-162.N), which can be disks, as henceforth assumed here to facilitate description. Alternatively, some or all of the mass storage devices 162 can be other types of storage, such as flash memory, SSDs, tape storage, etc.

Each of the nodes 158 is configured to include several modules, including an N-module 164, a D-module 166, and an M-host 168 (each of which may be implemented by using a separate software module) and an instance of, for example, a replicated database (RDB) 170. Specifically, node 158.1 includes an N-module 164.1, a D-module 166.1, and an M-host 168.1; node 158.N includes an N-module 164.N, a D-module 166.N, and an M-host 168.N; and so forth. The N-modules 164.1-164.M include functionality that enables nodes 158.1-158.N, respectively, to connect to one or more of the client systems 154 over the network 156, while the D-modules 166.1-166.N provide access to the data stored on the disks 162.1-162.N, respectively. The M-hosts 168 provide management functions for the clustered storage server system 152. Accordingly, each of the server nodes 158 in the clustered storage server arrangement provides the functionality of a storage server.

FIG. 1B illustrates that the RDB 170 is a database that is replicated throughout the cluster, i.e., each node 158 includes an instance of the RDB 170. The various instances of the RDB 170 are updated regularly to bring them into synchronization with each other. The RDB 170 provides cluster-wide storage of various information used by all of the nodes 158, including a volume location database (VLDB) (not shown). The VLDB is a database that indicates the location within the cluster of each volume in the cluster (i.e., the owning D-module 166 for each volume) and is used by the N-modules 164 to identify the appropriate D-module 166 for any given volume to which access is requested.

The nodes 158 are interconnected by a cluster switching fabric 160, which can be embodied as a Gigabit Ethernet switch, for example. The N-modules 164 and D-modules 166 cooperate to provide a highly-scalable, distributed storage system architecture of a clustered computing environment implementing exemplary embodiments of the present invention. Note that while there is shown an equal number of N-modules and D-modules in FIG. 1B, there may be differing numbers of N-modules and/or D-modules in accordance with various embodiments of the technique described here. For example, there need not be a one-to-one correspondence between the N-modules and D-modules. As such, the description of a node 158 comprising one N-module and one D-module should be understood to be illustrative only. Further, it will be understood that the client systems 154 (154.1-154.M) can also act as nodes and include data memory for storing some or all of the data set being maintained by the storage system.

In systems described herein, a single node may keep a master copy of the data set, which may be the source data set, with every other node maintaining a copy of the master data set, typically the destination data sets. For example, the node 102a may store the master copy, with nodes 102b-d synchronizing their data sets to the master copy stored in the node 102a. When a change to the master data set occurs at node 102a, for example by a user modification of the data set through a user interface associated with, for example, a database application running on node 102a, the node 102a sends a notification to the other nodes 102b-d that a change has been made to the source data set. In some embodiments, the change notification may be one or more data packets suitable for transmission over the network 120 and having data that includes a list of data elements that have been modified in the source data set. For example, the change notification may include data representative of a list such as:

"table 1, element 1,
element 2, . . . element N,"

where the listed elements are the elements in a table 1 of the tables in the database that have been changed in the source data set. In alternate embodiments, the change notification may be network data packets carrying an alert flag that signals that the source data set has been changed. In this practice the elements changed are not specified and the system is to determine the changes through another process. Upon receipt of this change notification, the nodes 102b-d synchronize their data sets to the source data set of the node 102a.

In some embodiments, the node storing the master copy may change to a different node. For example, if communication link 122a becomes unavailable, node 102b may be elected or voted by the nodes 102c and 102d to keep the master copy of the data set, with nodes 102c and 102d synchronizing their data sets to the data set kept by node 102b. In alternate embodiments, node 102b may be predetermined to act as the master node should node 102a become unavailable. Other methods for reassigning the master node will be known to those skilled in the art and any suitable technique may be used. In other alternate embodiments, the data set may be distributed among several nodes 102a-d in the storage system 100, with respective nodes storing a subset of the data set. In this embodiment, the source data set could be as a system level logical model or abstraction with the actual data distributed amongst several nodes, and with changes to a destination data set being issued from multiple nodes.

In any case, the above described system may not be possible to pause, interrupt, or lock the changes coming in from the source data set. Furthermore, changes from the source data set may be issued out of order or in ways which break the hierarchical consistency of the destination data set. For example, a parent data element may be added to the source data set at the node 102b and a child element may be added to the source data set at node 102c. If these changes were to arrive out of order at node 102a, e.g., due to network latency, then a child element could be added to the destination data set before its corresponding parent element, which may violate the hierarchical consistency of the destination data set and cause a transient data set inconsistency. In such a dynamic environment, the systems and methods described herein update the destination data set in an order dictated by the hierarchical relationships such that the destination data set maintains hierarchical consistency.

Figure 2:
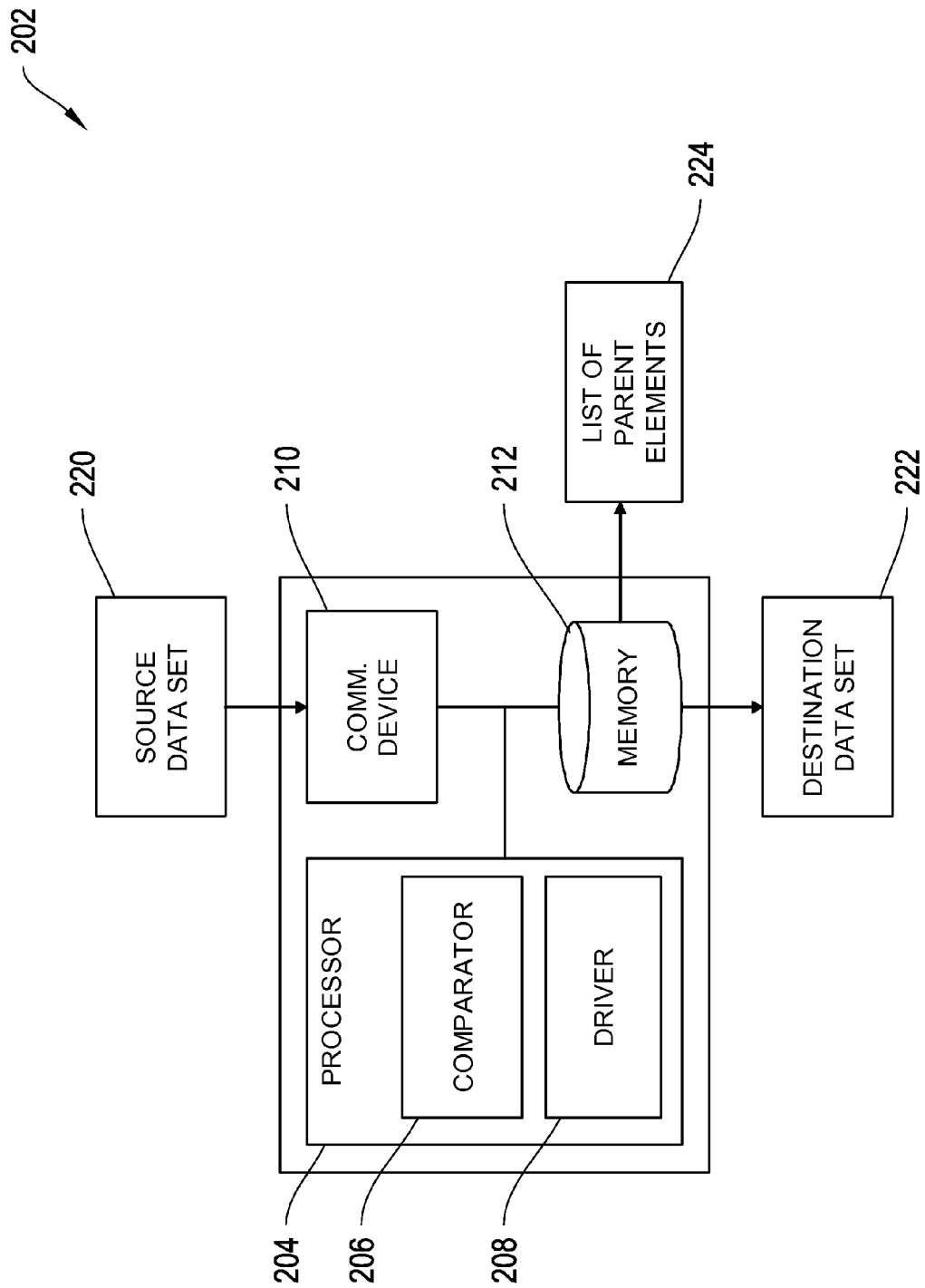
FIG. 2 is a schematic block diagram of a node for use in the distributed data set environment of FIG. 1.

FIG. 2 is a schematic block diagram of a single node 202 as used in the storage system 100 of FIG. 1A. The node 202 includes a processor 204 having a comparator 206 and driver 208, a communications device 210 configured to receive source data set 220, and a memory 212 configured to store a destination data set 222 and a list of parent elements 224. As described above, the node 202 can be any suitable computing device for storing and altering data sets with hierarchically dependent elements.

The processor 204 of node 202 is configured to update a destination data set 222 stored in memory 212 to be consistent with the source data set 220, accessible through the communications device 210. The processor 204 includes at least a comparator 206 and a driver 208. The comparator 206 compares the source data set 220 and the destination data set 222, identifies differences between the data sets, and identifies hierarchical relationships related to those differences. The driver 208 is configured to alter the destination data set 222 by performing changes in an order that is determined by the hierarchical relationships. The processor 204 can take the form of a general purpose processor, a microprocessor such as an application-specific integrated circuit (ASIC), a plurality of microprocessors, a field programmable gate array (FPGA), an embedded processor such as the ARM processor, or any other suitable processor for use in a computing system.

The communications device 210 of node 202 is configured to receive a notification that a change has been made to the source data set 220 from other nodes in the network 120. The communication device 210 can respond to the notification by accessing all or part of the source data set 220, which in this embodiment, represents the data set to which other data sets are to be synchronized. In one practice, the source data set 220 is passed to processor 204 for comparison with the destination data set 222 stored in memory 212. The communications device 210 may also transmit the destination data set 222 stored in memory 212 as well as a change notification indicating that a change has been made to the destination data set 222 to other nodes in the network 120. The communications device 210 could take the form of a wireless transmitter, a network interface card, a network switch, a network bridge, or any other suitable device for forwarding data through a network.

The memory 212 of node 202 is configured to store at least a destination data set 222 and a list of parent elements 224. Processor 204 accesses the destination data set 222 and compares it to the source data set 210 received by the communications device 210. Optionally, the processor may temporarily store a list of parent elements in memory, as will be described in more detail below. The memory 212, as described above in relation to FIG. 1A, can be any suitable memory device for storing a data set with hierarchically dependent elements.

In one illustrative example of a synchronization update, a user at a node, such as the node 102c in FIG. 1A, edits its local copy of the data set. The node 102c issues a change notification that may be transmitted to each other node maintaining a copy of the data set. Returning to FIG. 2, the node 202 is an example of a node that receives a change notification from node 102c, and in this example will also receive the source data set 220 from the node 102c. The data set of node 102c will be treated as the source data set. The processor 204 employs the change notification to initiate a comparison between the source data set 220 and the destination data set 222 stored in memory 212 of node 202. The comparator 206 identifies differences between the source data set 220 and the destination data set 222 as well as one or more data elements to be changed in the destination data set 222. The comparator 206 may use any suitable technique for comparing data sets to identify differences, and comparison operations are typically features of most database management systems. These and other techniques for comparing data sets may be employed. The comparator 206 may also identify the parent-child relationships of the data elements to be changed by revisions of the table relationship data, or using any other suitable method. For example, each element may store a list of its corresponding parent and children elements and an indication of its hierarchical relationships with other elements. The driver 208 may implement the changes in an order that is determined, at least in part, by these hierarchical relationships.

Figure 3:
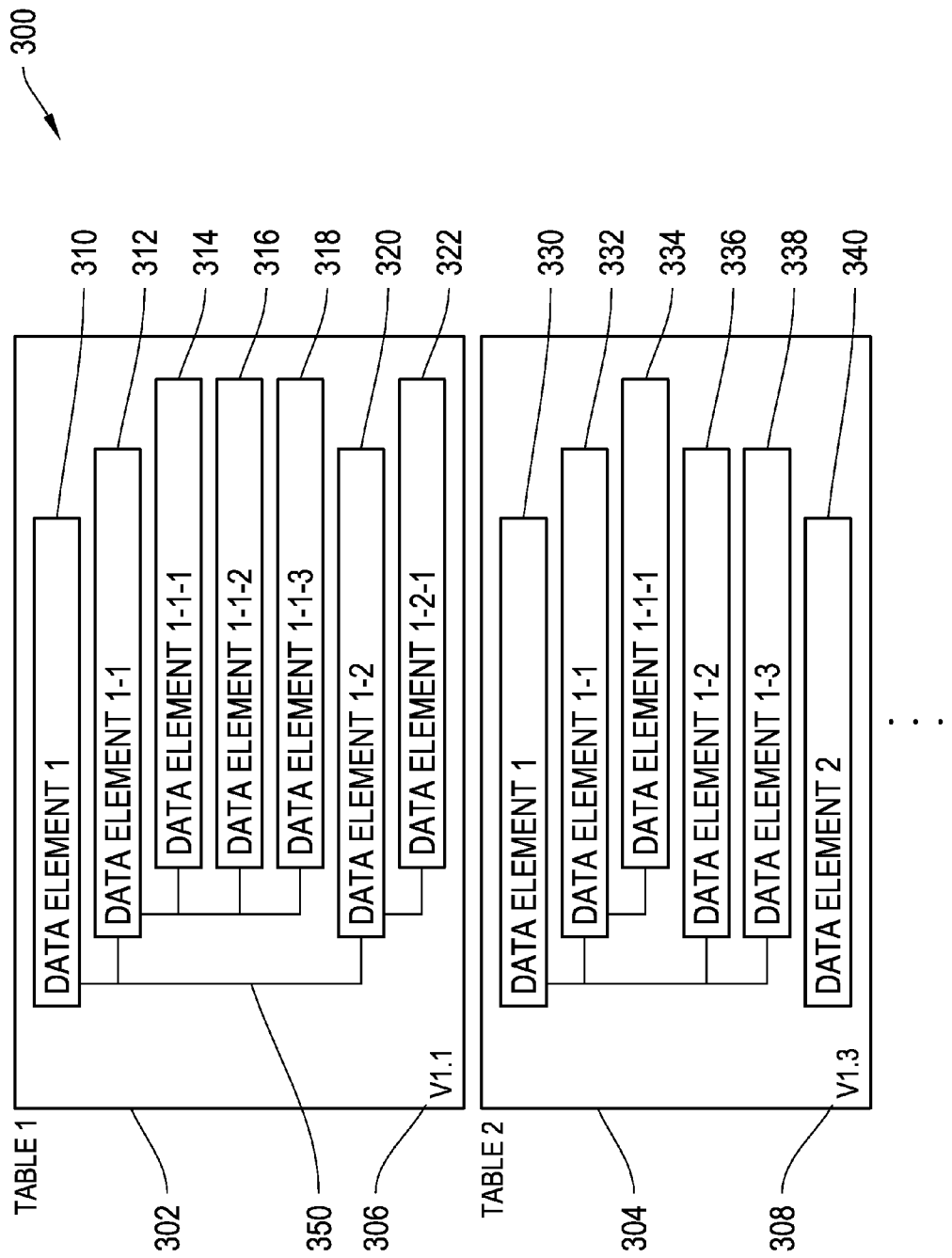
FIG. 3 shows a conceptual diagram of an exemplary data set with hierarchical data elements.

FIG. 3 depicts a conceptual diagram of an exemplary data set 300 with hierarchically dependent data elements 310-340. The data elements 310-340 may be optionally grouped into table 302 and table 304, labeled Table 1 and Table 2 respectively in FIG. 3. The data elements 310-340 are depicted visually as rows, but it will be appreciated by one skilled in the art that the data elements could be stored in any suitable arrangement and the arrangement selected will depend in part on the application at hand. The data elements 310-340 are ranked into successive levels such that the elements are represented as being above, i.e., a parent element, below, i.e., a child element, or at the same level as other data elements. A parent data element may have multiple children elements, and the parent-child relationships may go to an arbitrary depth to form a family tree. For example, the element 310 has the children elements 312 and 320, listed below the element 310. Further, the element 312 has the children elements 314, 316, and 318. Although not depicted in FIG. 3, children elements may also have multiple parent elements. In some embodiments, the data elements 310-340 may additionally be grouped into tables 302 and 304 with version number 306 or 308, which is incremented whenever a change is made to the corresponding table.

In some embodiments, the hierarchy may have a strict ordering. For example, the hierarchy may be ordered such that an element cannot be both a parent and a child of another element. Also, the hierarchy may be ordered such that children elements should not exist without their corresponding parent elements. Some embodiments may list the data elements in hierarchical order such that the parent elements are listed sequentially before their corresponding children elements. The data elements may have links, pointers, or metadata such as the links 350 to indicate their hierarchical relationships with other elements.

The data elements 310-340 of FIG. 1A may represent data structures which include, without limitation, user profile information, user preferences, security information, or log files. In some embodiments, the data elements may also include one or more attributes which describe the hierarchical relationships of the data element with other elements. For example, a parent element may include an attribute which determines the maximum number of children that may be hierarchically dependent upon the parent element.

Methods for synchronizing a destination data set in relation to a source data set while maintaining hierarchical consistency will now be discussed in relation to the illustrative examples depicted in FIGS. 4-6. For the purposes of discussion, the source node will be node 102a in network 100, while the destination node will be 102b, although it will be appreciated by those skilled in the art that other combinations of source and destination nodes may be possible as described above.

Figure 4:
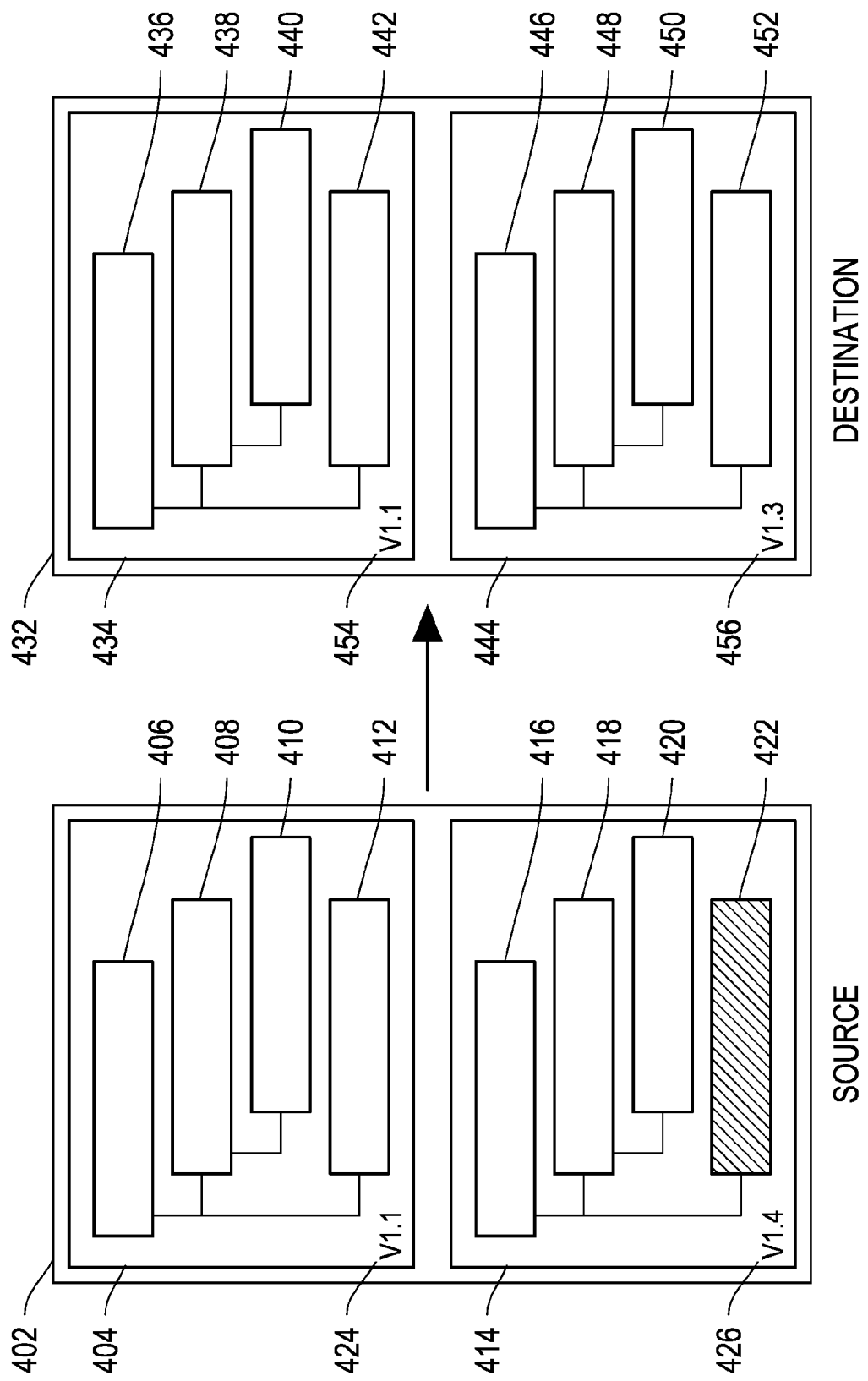
FIG. 4 depicts an illustrative example of a modification update from a source data set to a destination data set.

FIG. 4 depicts an illustrative example of a modification update from a source data set in node 102a to a destination data set in node 102b. The source data set 402 includes table 404 comprising version number 424 and data elements 406-412, and table 414 comprising version number 426 and data elements 416-422. The destination data set 432 includes table 434 comprising version number 454 and data elements 436-442, and table 444 comprising version number 456 and data elements 446-452.

When a change occurs to data element 422 in the source data set 402, a change notification is issued over network 120 by node 102a. As described above, if the changes are processed in the order that they are received, the hierarchical relationships between the data elements of the destination data set 432 could be violated. As a result, although the change notification may contain information indicating the location and nature of the change, the comparator 206 of destination node 102b uses the change notification primarily as a trigger to initiate a comparison process between the source data set 402 and the destination data set 432.

In the example depicted in FIG. 4, the data element 422 has been modified in the source data set 402. Upon receipt of the change notification, the comparator 206 of destination node 102b begins a comparison to identify any differences between the source data set 402 and the destination data set 432. In some embodiments, the comparator 206 begins with comparing the first data element 406 in the source data set 402 with the first data element 436 in the destination data set 432. The comparator 206 continues to compare the data elements in sequential order, starting from the top of the data set, until a difference between the source data set 402 and destination data set 432 is found. In alternate embodiments, the comparator 206 begins by comparing the version number 424 of the first table 404 in the source data set 402 with the version number 454 of the first table 434 in the destination data set 432. If the version numbers of the first tables are the same, the comparator 206 continues to the next table until a difference in the version numbers is found. In this way, the comparator 206 can progress through tables which have not been modified and more efficiently narrow the search to altered portions of the data set. For example, the version number 426 denotes table version v1.4 in the source data set 402 while version number 456 denotes table version v1.3 in the destination data set 432. The comparator 206 proceeds to compare the data elements within the tables 414 and 444 in sequential order to identify a difference.

Comparator 206 may identify a data element to be modified in the destination data set 432 as well as its hierarchical relationships. In FIG. 4, the data element 422 has been modified, and the driver 208 updates the corresponding data element 452 in the destination data set 432. This modification does not change any hierarchical relationships, so the modification to element 452 is performed.

In some cases, the modification of a data element may change the hierarchical relationships with other data elements. For example, a modification to a parent element could reduce the number of children elements that can be hierarchically dependent on the parent element. In such a case, the driver 208 deletes the children elements prior to the modification to the parent element. In FIG. 4, a modification to element 416 in the source data set 402 may reduce the number of children that can be hierarchically dependent on element 416 from two child elements to one, resulting in element 422 being deleted from the source data set 402. In the synchronization process, the driver 208 deletes element 452 from the destination data set 432 prior to the modification of element 446.

At unscheduled times during the comparison process, another change notification can be issued by the source node 102*a*. Upon receipt of the change notification, the comparator 206 of destination node 102*b* restarts the comparison process from the beginning of the data set. The driver 208 maintains hierarchical consistency by modifying the destination data set 432 in an order that avoids the production of a child element lacking a parent element. Furthermore, this order of operations reduces the likelihood that an intervening read operation of the destination data set 432 will result in a read of a child element that has already been deleted from the source data set 402, thereby maintaining data integrity between the source data set 402 and the destination data set 432. As such, the comparator 206 of destination node 102*b* may restart the comparison process from the beginning of the data set at unscheduled times while maintaining data integrity. In some embodiments, the comparison process is restarted after a delay to allow more changes to occur to source data set 402 before the update process begins again.

Figure 5:
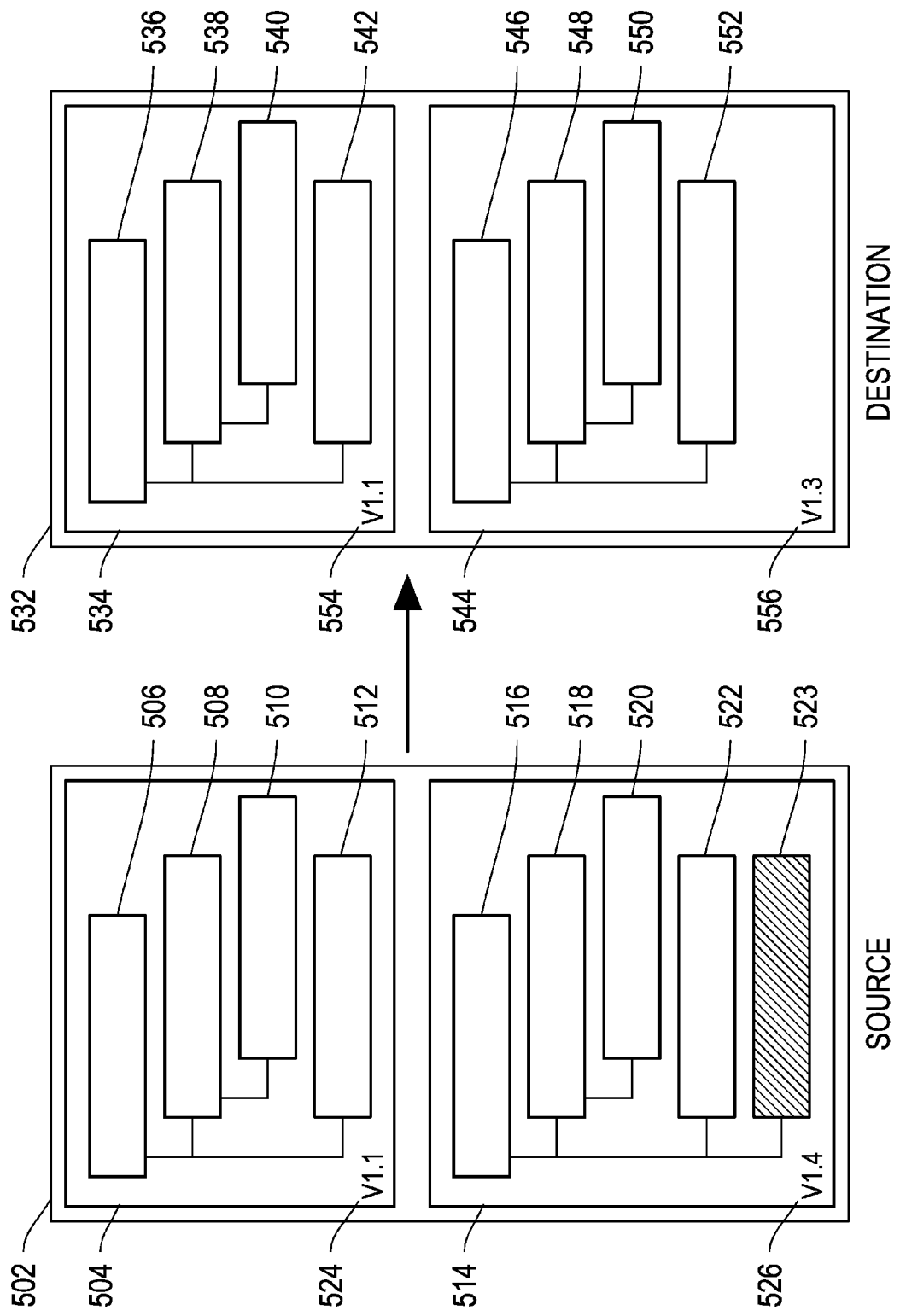
FIG. 5 depicts an illustrative example of an addition update from a source data set to a destination data set.

FIG. 5 depicts an illustrative example of an addition update from a source data set 502 to a destination data set 532. The source data set 502 includes table 504 comprising version number 524 and data elements 506-512, and table 514 comprising version number 526 and data elements 516-523. The destination data set 532 includes table 534 comprising version number 554 and data elements 536-542, and table 544 comprising version number 556 and data elements 546-552.

When the element 523 is added to the source data set 502, source node 102*a* issues a change notification over network 120. In a process similar to the method described in relation to FIG. 4, the comparator 206 of destination node 102*b* uses the change notification primarily as an indication to start a comparison process between the source data set 502 and the destination data set 532. The comparator 206 begins at the top of the data set and may compare the elements in sequential order to determine a difference between the source data set 502 and destination data set 532. In alternate embodiments, the comparator 206 first compares table version numbers 524 and 554 to determine which tables have been modified. Upon finding a modified table, the comparator 206 continues the comparison of the data elements within the modified table in sequential order to determine a difference between the source data set 502 and the destination data set 532.

In FIG. 5, the destination node 102*b* determines that the table 514 is a modified table by comparing the table version numbers 526 and 556, and identifies the element 523 as a difference between the source data set and the destination data set. In this case the identified difference is an addition to the source data set 502. In the case of an addition, the driver 208 alters the destination set and to that end performs an addition operation such that parent elements are added before corresponding children elements. By listing the elements of the data set in the order of their hierarchical order, the parent element will be listed before its corresponding children elements, and the driver 208, operating from this list and moving through the list in order, will add the elements in an order determined by the identified hierarchical characteristic of these identified differences.

Figure 6:
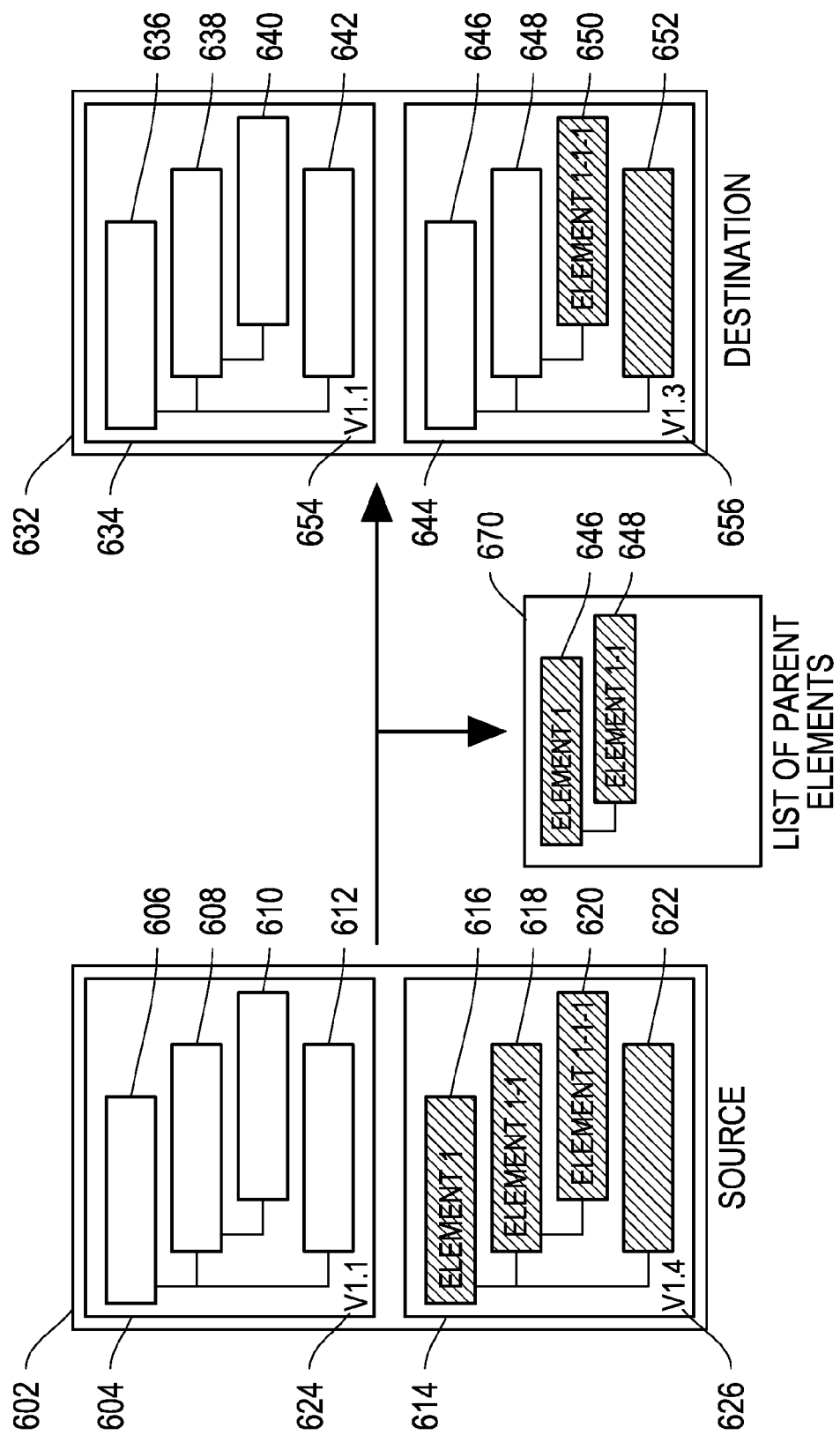
FIG. 6 depicts an illustrative example of a deletion update from a source data set to a destination data set.

FIG. 6 depicts an illustrative example of a deletion update from a source data set 602 to a destination data set 632. The source data set 602 includes table 604 comprising version number 624 and data elements 606-612, and table 614 comprising version number 626 and data elements 616-622. The destination data set 632 includes table 634 comprising version number 654 and data elements 636-642, and table 644 comprising version number 656 and data elements 646-652. The list of parent elements 670 includes depicted parent elements 646 and 648.

When the elements 616, 618, and 620 are deleted from the source data set 602, node 102*a* issues a change notification over network 120. In a process similar to the method described in relation to FIGS. 4 and 5, the comparator 206 of destination node 102*b* uses the change notification as an indication to start a comparison process between the source data set 602 and destination data set 632. In one practice, the comparator 206 begins at the top of the data set or at any point that represents logically the beginning of the data set. For example, this may mean starting at the first row and first column of the first table. However, the starting point used by the comparator 206 and the process applied will depend upon the organization of the data set and other factors. Thus, the process may compare the elements in sequential order to determine a difference between the source data set 602 and destination data set 632. In alternate practices, the comparator 206 first compares table version numbers 624 and 654 to determine which tables have been modified. Upon finding a modified table, the comparator 206 continues the comparison of the data elements within the modified table to determine a difference between the source data set 602 and the destination data set 632.

In contrast to the modification and addition changes described with reference to FIGS. 4 and 5, a deletion change may include additional steps to maintain hierarchical consistency of the destination data set 632. In particular, the driver 208 may perform the deletion of data elements from the destination data set 632 in an order which deletes children elements prior to the deletion of their corresponding parent elements.

In the example depicted in FIG. 6, the comparator 206 of destination node 102*b* identifies element 616 as having been deleted from source data set 602. As a result, hierarchically dependent child elements 618, 620, and 622 are also deleted from source data set 602. The comparator 206 identifies element 646 to be deleted from the destination data set 632. However, instead of deleting element 646, the driver 208 of node 102*b* identifies the child elements with no other dependent elements in the family tree for element 646, in this case elements 650 and 652. Driver 208 deletes elements 650 and 652 from destination data set 632, as deletion of those elements will not leave any child elements without parent elements. The remainder of the elements in the family tree, in this case elements 646 and 648, are added to a list of parent elements 670 to be processed at a later time. The comparator 206 then continues to identify further differences between the source data set 602 and the destination data set 632.

The driver 208 of destination node 102*b* deletes the elements in the list of parent elements 670 from the destination data set 632 beginning with elements in the list 670 which lack hierarchically dependent elements. In some embodiments, the driver 208 identifies which elements in the list lack hierarchically dependent elements, deletes the identified elements from the list 670, and repeats the process until all elements from the list 670 have been deleted. In alternate embodiments, the driver 208 deletes the elements from the list 670 in reverse order from the order in which they were added to the list. Other embodiments may use other techniques for deleting elements from the list 670 in an order that maintains data integrity between data set copies.

In the example depicted in FIG. 6, the driver 208 deletes element 648 from the destination data set 632. The driver subsequently deletes element 646 from the destination data set 632. Deleting the parent elements in this order preserves the hierarchical consistency of the destination data set 632 by deleting child elements prior to their corresponding parent elements. For example, if parent element 646 was deleted first, and a change notification arrived before elements 648 and 650 were deleted, then the comparison process would be restarted while leaving child elements 648 and 650 without their parent element 646, violating the hierarchical consistency of the destination data set 632.

Figure 7:
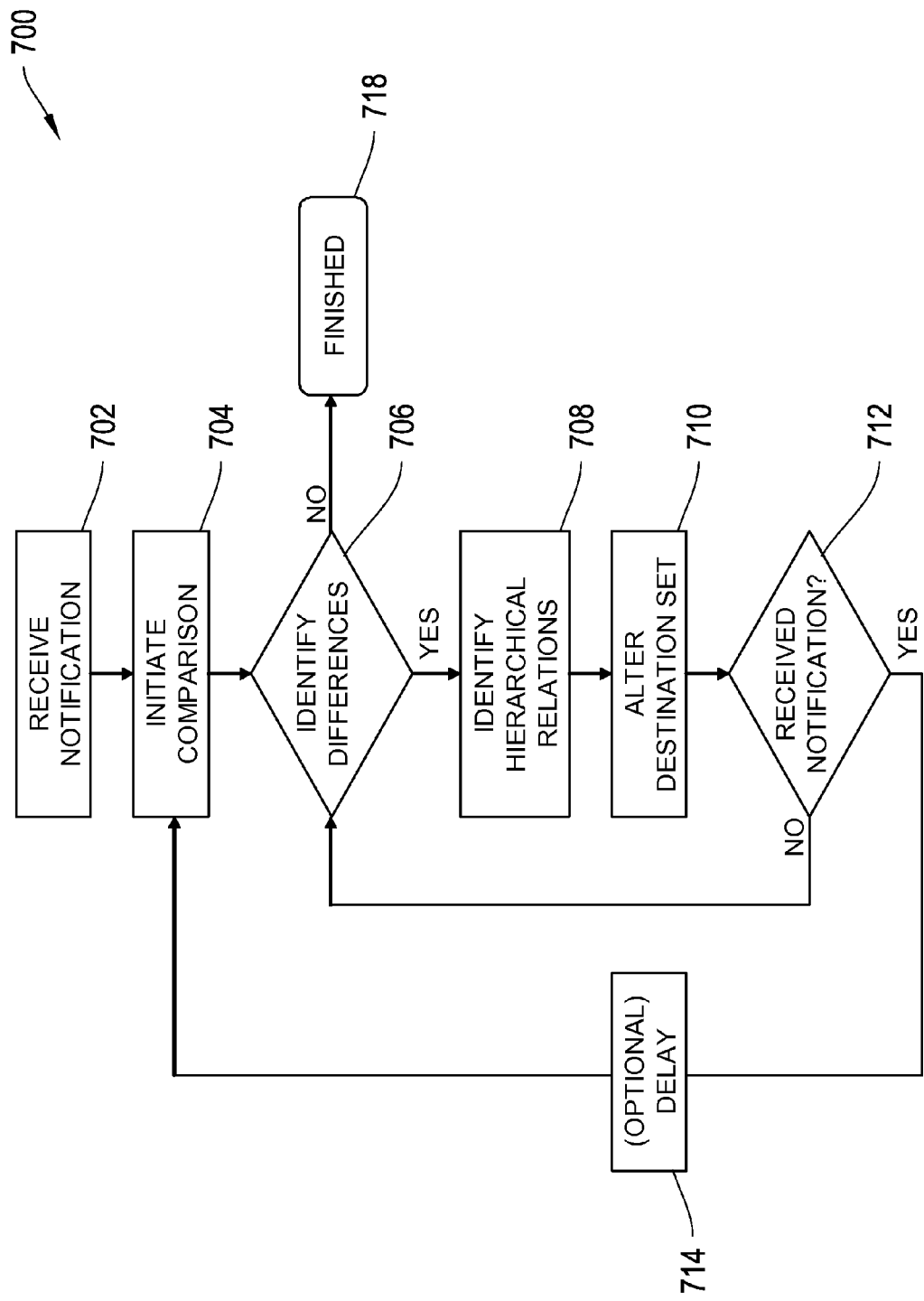
FIG. 7 is a flowchart of one method for performing an addition or modification update from a source data set to a destination data set.

FIG. 7 is a flowchart of a method 700 for performing an addition or modification update from a source data set to a destination data set. The method 700 includes receiving a change notification at a destination node at step 702, initiating a comparison between the source and destination data set at step 704, identifying differences between the source and destination data set decision at step 706, identifying hierarchical characteristics of the identified differences at step 708, and altering the destination data based at least in part on the hierarchical relationships at step 710. The method 700 further includes detecting, at decision step 712, whether an additional change notification has been issued and initiating the comparison after an optional delay at step 714. When there are no more differences detected and no further change notifications have been received, the method 700 terminates at step 718.

As set forth above, a first step, step 702, in performing an addition or modification update is to receive, at a destination node, a change notification from a source node. The change notification may include information regarding the location and the nature of the change. Upon receipt of the change notification, the method 700 initiates a comparison between the source and destination data set at step 704. The comparison can be performed using any suitable technique for identifying differences between two data sets, including a modification, addition, or deletion of a data element. In some embodiments, the comparison begins at the beginning of the data set and compares the data elements in the sequential order. In alternate embodiments, the comparison begins by first identifying modified tables and comparing the elements in the modified tables in sequential order.

A difference between the source and destination data set is identified in step 706, and the hierarchical relationships of the data elements to be changed in the destination data set is determined at step 708. Using this information, the method 700 alters the destination data set based, at least in part, on the hierarchical relationships to maintain the hierarchical consistency of the destination data set. For example, as discussed above, a modification update to a parent element could affect related children elements, in which case the modification is performed in such a way that the child elements are modified before their corresponding parent element. Similarly, the addition of a child element is made subsequent to the addition of its corresponding parent element.

At any point, the method 700 determines whether an additional change notification has been received at decision 712. If an additional change notification has not been received, the method 700 continues to identify differences between the source and destination data sets. When all differences between the data sets have been identified and resolved, the synchronization process is complete, and the method 700 terminates at step 718. If an additional change notification has been received at step 712, then the comparison is initiated at the beginning of the data set at step 704. In some embodiments, the method 700 is restarted after a delay at step 714 to allow more change notifications to be issued before another comparison is initiated.

Figure 8:
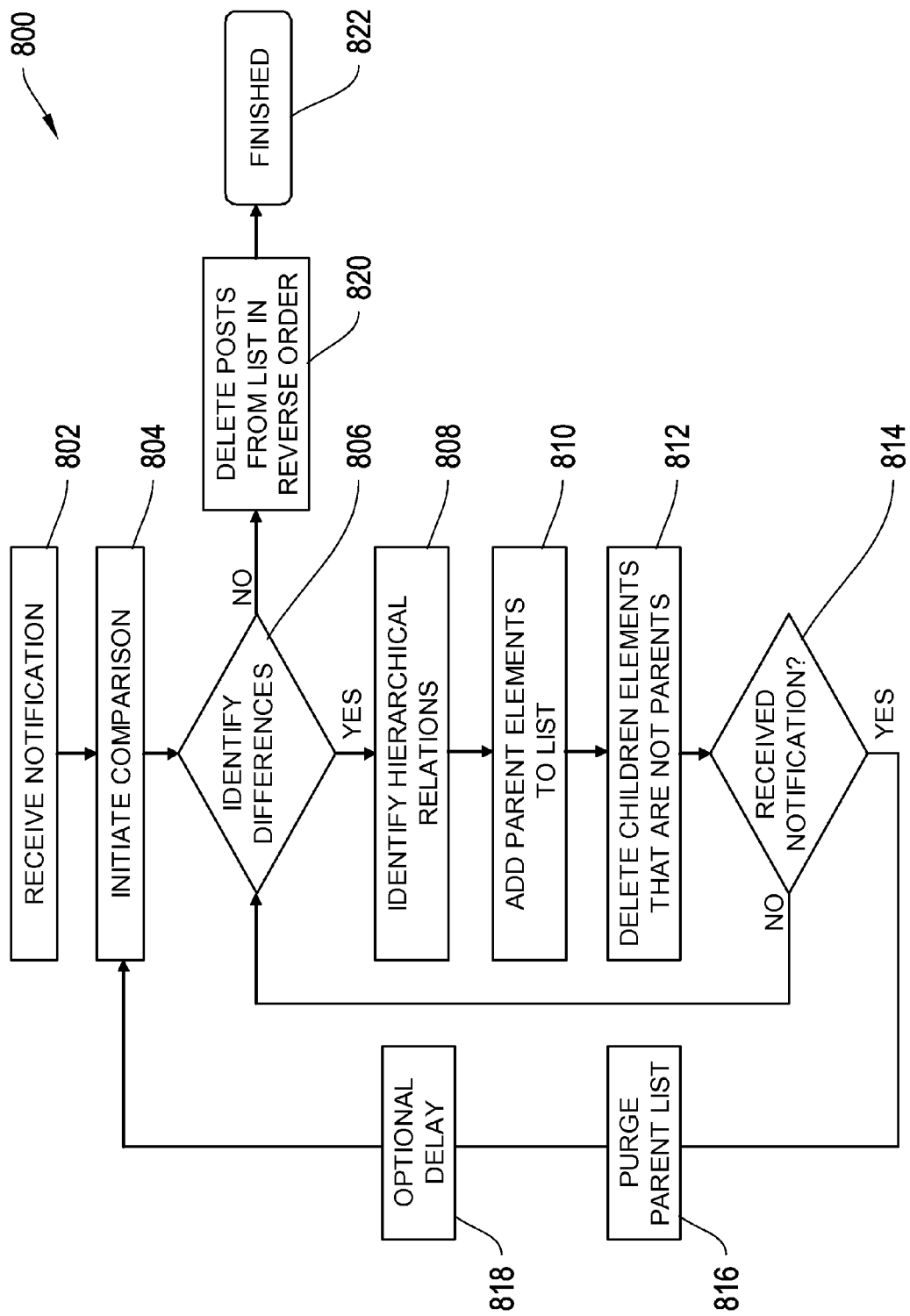
FIG. 8 is a flowchart of a method for performing a deletion update from a source data set to a destination data set.

FIG. 8 is a flowchart of a method for performing a deletion update from a source data set to a destination data set. The method 800 includes receiving a change notification at step 802, initiating a comparison between the source data set and destination data set at step 804, identifying differences between the source and destination data set at decision 806, identifying hierarchical characteristics of the identified differences at step 808, adding parent elements to a list of parent elements at step 810, and deleting children elements that are not parent elements at step 812. The method 800 further comprises detecting whether an additional change notification has been received at decision 814, and upon determining that an additional change notification has been received, purging the parent list at step 816 and initiating the comparison after an optional delay at step 818. When there are no more differences detected and no further change notifications have been received, the method 800 deletes parents from the list of parent elements in reverse order at step 820 and terminates at step 822.

Similar to the method 700, the method 800 begins at step 802 upon receiving, at a destination node, a change notification from a source node. The change notification may be a series of data packets carried over the network 120 and have information regarding the location and the nature of the change. Upon receipt of the change notification, the method 800 initiates a comparison between the source and destination data set at step 804. The comparison can be performed using any suitable technique for identifying differences between two data sets, including a modification, addition, or deletion of a data element. In some embodiments, the comparison begins at the beginning of the data set and compares the data elements in the sequential order. In alternate embodiments, the comparison begins by first identifying modified tables and comparing the elements in the modified tables in sequential order.

A difference between the source and destination data set is identified at step 806, and the hierarchical relationships of the data elements to be changed in the destination data set is determined at step 808. In the case of a deletion of a data element, identifying the affected hierarchical relationships includes identifying any children elements that are hierarchically dependent on the element to be deleted. From the identified children elements, the elements which are themselves parent elements are added to a list of parent elements at step 810. The remaining identified children elements, which do not have any hierarchically dependent elements, are deleted from the destination data set at step 812.

At any point, the method 800 determines whether an additional change notification has been received at decision 814. If an additional change notification has not been received, the method 800 continues to identify differences between the source and destination data sets. When all differences have been identified, the method 800 deletes the data elements from the list of parent elements in reverse order from which the elements were added to the list at step 820. In this way, children elements are deleted before their corresponding parent elements, and the hierarchical consistency of the destination data set is preserved. When the parent elements have been deleted from the destination data set, the synchronization is complete and the method 800 terminates at step 822.

If an additional change notification is received at any point during the method 800, the list of parent elements is purged, i.e., the elements are deleted from the list at step 816. The method 800 then restarts the comparison at the beginning of the data set at step 804. In some embodiments, the method is restarted after a delay at step 818 to allow more change notifications to be issued before another comparison is initiated.

Some embodiments of the above described may be conveniently implemented using a conventional general purpose digital computer or server that has been programmed to carry out the methods described herein. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium having instructions stored thereon/in and, when executed, e.g., by a processor, perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks, optical disks, DVDs, CD-ROMs, micro-drives, and magneto-optical disks, ROMs, RAMs, EPROMs, EEPROMs, DRAMs, VRAMs, flash memory devices including flash cards, magnetic or optical cards, nanosystems including molecular memory ICs, RAID devices, remote data storage/archive/warehousing, or any other type of media or device suitable for storing instructions and/or data thereon/in.

Additionally, the systems and methods described herein may be applied to any storage application that includes data set copies which are to be synchronized. These systems can work with any storage medium, including discs, RAM, and hybrid systems that store data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein. The term "storage system" should, therefore, be taken broadly to include such arrangements.

Stored on any one of the computer readable medium, some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming software of the general-purpose/specialized computer or microprocessor are software modules for implementing some embodiments.

The method can be realized as a software component operating on a conventional data processing system such as a Unix workstation. In that embodiment, the synchronization method can be implemented as a C language computer program, or a computer program written in any high level language including C++, Fortran, Java or BASIC. See The C++ Programming Language, 2nd Ed., Stroustrup Addision-Wesley. Additionally, in an embodiment where microcontrollers or DSPs are employed, the synchronization method can be realized as a computer program written in microcode or written in a high level language and compiled down to microcode that can be executed on the platform employed.

It will be apparent to those skilled in the art that such embodiments are provided by way of example only. It should be understood that numerous variation, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A method for consistent data synchronization, comprising:

receiving, by a storage synchronization computing device, an indication of one or more changes in a source data set;

initiating, by the storage synchronization computing device, a comparison between the source data set and a destination data set, the source data set comprising parent data elements and at least one corresponding child data element and the destination data set comprising destination parent data elements and at least one corresponding destination child data element;

identifying, by the storage synchronization computing device, one or more differences between the source data set and the destination data set, the one or more differences comprising one or more related hierarchical relationships between the parent data elements and the at least one corresponding child data element in the source data set and the destination parent data elements and the at least one corresponding destination child data element in the destination set; and altering, by the storage synchronization computing device, the destination data set by performing a sequence of changes corresponding to the identified one or more differences between the source data set and the destination data set in an order based on the one or more related hierarchical relationships, wherein the sequence of changes comprises deleting any of the destination parent data elements lacking the at least one corresponding destination child data element before deleting any of the destination parent data elements comprising the at least one corresponding destination child data element.

2. The method of claim 1, wherein the source data set and the destination data set include tables of data elements and the initiating a comparison further comprises comparing at least one of the data elements within the corresponding tables or a data element within the corresponding tables representative of a version number of the table.

3. The method of claim 1, wherein the identifying further comprises identifying meta-data associated with the source data set and representative of the hierarchical relationships between the data elements associated with the identified one or more differences.

4. The method of claim 1, further comprising: generating, by the storage synchronization computing device, a list of the identified one or more differences and the hierarchical relationship of data elements associated with the identified one or more differences.

5. The method of claim 1, wherein altering the destination data set comprises:
synchronizing, by the storage synchronization computing device, the destination data set to the source data set by processing a list of identified one or more differences and related hierarchical relationships and causing changes to the destination data set in a sequence determined by the related hierarchical relationships.

6. The method of claim 1, wherein altering the destination data set includes deleting from the destination data set, data elements comprising a parent and child hierarchical relationship through a sequence of operations that delete at least one of the destination parent elements in the destination data set subsequent to the deletion of at least one corresponding destination child element.

7. The method of claim 1 further comprising:
identifying, by the storage synchronization computing device, a destination data set element to be deleted;
identifying, by the storage synchronization computing device, one or more destination child elements that are hierarchically dependent on the identified destination data set element;
adding, by the storage synchronization computing device, the identified elements comprising the destination child elements to a list of parent elements;
deleting, by the storage synchronization computing device, from the destination data set any of the identified destination parent elements lacking one or more child elements; and
deleting, by the storage synchronization computing device, the destination parent elements on the list of destination parent elements from the destination data set in reverse order from which the destination parent elements were added to the list.

8. A storage synchronization computing device, comprising:
at least one processor;
a memory coupled to the processor and configured to be capable of storing programmed instructions that comprise and stored are in the memory to:
receive an indication of one or more changes in a source data set has one or more changes;
initiate a comparison between the source data set and the destination data set, the source data set comprising parent data elements and at least one corresponding child data element and the destination data set comprising destination parent data elements and at least one corresponding destination child data element;
identify one or more differences between the source data set and the destination data set, the one or more differences comprising one or more related hierarchical relationships between the parent data elements and the at least one corresponding child data element associated with the source data set and the destination parent data elements and the at least one corresponding destination child data element in the destination set; and
alter the destination data set by performing a sequence of changes corresponding to the identified one or more differences between the source data set and the destination data set in an order based on the one or more related hierarchical relationships, wherein the sequence of changes comprises deleting any of the destination parent data elements lacking the at least one corresponding destination child data element before deleting any of the destination parent data elements comprising the at least one corresponding destination child data element.

9. The device of claim 8, wherein the source data set and the destination data set comprises tables of data elements and the initiating a comparison further comprises comparing at least one of the data elements within the corresponding tables or a data element within the corresponding tables representative of a version number of the table.

10. The device of claim 8, wherein the processor is further configured to be capable of executing programmed instructions for the identifying that comprise and are stored in the memory to:
identify meta-data associated with the source data set and representative of the hierarchical relationships between the data elements associated with the identified one or more differences.

11. The device of claim 8, wherein the processor is further configured to be capable of executing programmed instructions that comprise and are stored in the memory to:
generating a list of the identified one or more differences and the hierarchical relationship of data elements associated with the identified one or more differences.

12. The device of claim 8, wherein altering the destination data set further comprises:
synchronizing the destination data set to the source data set by processing a list of identified one or more differences and related hierarchical relationships and causing changes to the destination data set in a sequence determined by the related hierarchical relationships.

13. The device of claim 8, wherein altering the destination data set includes deleting from the destination data set, data elements comprising a parent and child hierarchical relationship through a sequence of operations that delete a parent element in the destination data set subsequent to the deletion of a corresponding child element.

14. The device of claim 8, wherein the processor is further configured to be capable of executing programmed instructions that comprise and are stored in the memory to:
identify a destination data set element to be deleted;
identify one or more child elements that are hierarchically dependent on the identified destination data set element;
add the identified destination parent elements comprising destination child elements to a list of parent elements;
delete from the destination data set any of the identified destination parent elements lacking one or more child elements; and
delete the destination parent elements on the list of parent elements from the destination data set in reverse order from which the destination parent elements were added to the list.

15. A non-transitory computer readable medium having stored thereon instructions for consistent data synchronization comprising machine executable code which when executed by at least one processor, causes the processor to perform steps comprising:

receiving an indication of one or more changes in a source data set;

initiating a comparison between the source data set and a destination data set, the source data set comprising parent data elements and at least one corresponding child data element and the destination data set comprising destination parent data elements and at least one corresponding destination child data element;

identifying one or more differences between the source data set and the destination data set, the one or more differences comprising one or more related hierarchical relationships between the parent data elements and the at least one corresponding child data element associated with the source data set and the destination parent data elements and the at least one corresponding destination child data element in the destination set; and altering the destination data set by performing a sequence of changes corresponding to the identified one or more differences between the source data set and the destination data set in an order based on the one or more related hierarchical relationships, wherein the sequence of changes comprises deleting any of the destination parent data elements lacking the at least one corresponding destination child data element before deleting any of the destination parent data elements comprising the at least one corresponding destination child data element.

16. The medium of claim 15, wherein the source data set and the destination data set include tables of data elements and the initiating a comparison further comprises comparing at least one of the data elements within the corresponding tables or a data element within the corresponding tables representative of a version number of the table.

17. The medium of claim 15, wherein the identifying further comprises identifying meta-data associated with the source data set and representative of the hierarchical relationships between the data elements associated with the identified one or more differences.

18. The medium of claim 15, further having stored thereon instructions further comprising machine executable code which when executed by the processor, causes the processor to perform steps further comprising:

generating a list of the identified one or more differences and the hierarchical relationship of data elements associated with the identified one or more differences.

19. The medium of claim 15, wherein altering the destination data set further comprises:

synchronizing the destination data set to the source data set by processing a list of identified one or more differences and related hierarchical relationships and causing changes to the destination data set in a sequence determined by the related hierarchical relationships.

20. The medium of claim 15, wherein altering the destination data set further comprises deleting from the destination data set, data elements comprising a parent and child hierarchical relationship through a sequence of operations that delete a parent element in the destination data set subsequent to the deletion of a corresponding child element.

21. The medium of claim 15, further having stored thereon instructions further comprising machine executable code which when executed by the processor, causes the processor to perform steps further comprising:

identifying a destination data set element to be deleted;

identifying one or more destination child elements that are hierarchically dependent on the identified destination parent data set elements;

adding the identified elements comprising destination child elements to a list of destination parent elements;

deleting from the destination data set any of the identified destination parent elements lacking one or more destination child elements; and deleting the destination parent elements on the list of destination parent elements from the destination data set in reverse order from which the destination parent elements were added to the list.

\* \* \* \* \*